United States Patent [19]

Harrah

[11] Patent Number: 5,375,286
[45] Date of Patent: Dec. 27, 1994

[54] QUICK-RELEASE CONNECTOR FOR MOP HANDLES AND THE LIKE

[75] Inventor: David W. Harrah, Merriam, Kans.

[73] Assignee: QRC Partnership, Buena Vista, Kans.

[21] Appl. No.: 56,852

[22] Filed: May 3, 1993

Related U.S. Application Data

[63] Continuation-in-part of Ser. No. 648,018, Jan. 30, 1991, Pat. No. 5,207,754.

[51] Int. Cl.⁵ ............................................. A47L 13/24
[52] U.S. Cl. ................................. 15/147.1; 15/229.1; 15/147.2; 24/625
[58] Field of Search .................. 15/147.1, 229.1, 228, 15/147.2; 24/230, 615, 625; 403/121

[56] References Cited

U.S. PATENT DOCUMENTS

| | | | |
|---|---|---|---|
| 1,420,639 | 6/1922 | Sturgis | 15/147 A |
| 3,145,406 | 8/1964 | Lay | 15/147 |
| 3,432,873 | 3/1969 | Moss | 15/118 |
| 3,639,950 | 2/1972 | Lutz et al. | 214/230 |
| 3,795,934 | 3/1974 | Moss | 15/229 A |
| 4,150,464 | 4/1979 | Tracy | 24/77 |
| 4,171,555 | 10/1979 | Bakker et al. | 24/200 |
| 4,306,326 | 12/1981 | Kim | 15/105 |
| 4,433,931 | 2/1984 | Malish et al. | 403/194 |
| 4,648,738 | 3/1987 | Thielen | 403/341 |
| 4,825,515 | 5/1989 | Wolterstorf, Jr. | 24/625 |
| 4,831,694 | 5/1989 | Kong | 24/625 |
| 5,066,162 | 11/1991 | Wall et al. | 15/147.1 |
| 5,222,279 | 6/1993 | Franco et al. | 24/625 |

FOREIGN PATENT DOCUMENTS

| | | | |
|---|---|---|---|
| 200733 | 7/1923 | United Kingdom | 15/229.1 |
| 626918 | 7/1949 | United Kingdom | 15/229.1 |

*Primary Examiner*—David A. Scherbel
*Assistant Examiner*—Patrick F. Brinson
*Attorney, Agent, or Firm*—Kenneth W. Iles

[57] ABSTRACT

A quick-release connector for connecting a handle to a mop head or the like comprises a first section for attachment to the handle and a second section for attachment to the mop head. The first section has a plurality of receptacles which mate with a similar plurality of bayonet projections in the second section. At least one of the bayonet projections is resiliently flexible and flexes outward when the first and second sections are pushed together so as to mate with and be securely gripped by an indentation in the first section providing a positive interlock between the sections. Another of the bayonet projections is a rigid, longer bayonet which acts as a guide when the two sections are connected together. The first section also has a polygon-shaped, shallow recess which mates with a similar polygon-shaped protrusion in the second section when the two sections are pushed together to provide resistance to torsional stress. The connector can be attached to a mop head or fitted with a male threaded rod for attachment to a broom handle, paint roller, or the like.

15 Claims, 11 Drawing Sheets

QUICK-RELEASE CONNECTOR FOR MOP HANDLES AND THE LIKE

STATEMENT OF RELATED APPLICATIONS

This application is a continuation-in-part of U.S. Ser. No. 07/648,018, filed Jan. 30, 1991, now U.S. Pat. No. 5,207,754.

FIELD OF THE INVENTION

The invention relates to a quick-connect and release connector for attaching, for example, a mop handle to a mop head or the like. More particularly, the present invention is related to a quick-connect and disconnect fitting having a plurality of bayonets on a male fitting that mate and lock with a plurality of female fittings in a separate piece, which allows handles to be readily attached and detached from any of a wide variety of tools quickly and easily, while providing a firm rigid connection between the handle and the tool, or working head, allowing vigorous use of time tool without sacrificing the working force required for a particular job.

DESCRIPTION OF RELATED ART INCLUDING INFORMATION DISCLOSED UNDER 37 C.F.R. Sections 1.97–1.99

Mops, brooms, paint rollers, etc. conventionally incorporate handles which are removable from the operating head of the implement. It is conventional with brooms and paint rollers at least, to use a threaded connector between the handle and the implement head. Mops, on the other hand, due to the fact that the mop head wears out long before the handle, have long used various types of connection mechanisms to connect the mop head with the handle. Quite often these connection mechanisms have employed rivets, bolts, screws, etc. which must be removed and reinstalled when the head is removed from the handle. This tends to be a time-consuming operation and may be beyond the skill level of the typical relatively unskilled worker who uses the mop.

Also the prior connectors between handle and implement have been difficult to align and assemble and prone to excessive wear from the repeated removal and reinstallation of the rivets, bolts, etc. Furthermore, these designs have been unable to withstand the considerable tensile, shear and torsional forces constantly imposed upon, for example a mop head, during typical use.

It is not unusual for an institutional user, such as a hospital, fast food restaurant or the like, to wear out a mop head in as little as a few days. The prior art connection designs have tended to be rather complex, expensive, and have greatly added to the cost, bulk and weight of the typical mop head.

It is clear then, that a simple, reliable, and inexpensive quick-release connector for connecting handles to mop heads, broom heads, paint rollers and the like is needed. It is also clear that such a connector should be simple to operate, able to withstand the considerable stresses placed upon it during mopping, sweeping, etc, and should be economically discardable with the mop head.

SUMMARY OF THE INVENTION

The present invention is a quick-connect and release connector for connecting a handle to a mop head, broom head, paint roller or the like. The connector includes two main elements that are a handle portion and a head portion. The handle portion is a cylindrical member with a circular bore at one end to receive one end of the mop handle and which is permanently affixed thereto by gluing or other permanent connection techniques. The other end of the cylindrical handle portion has a relatively shallow recess adapted to mate with a corresponding protrusion on the head portion.

Within the recess on the handle portion are a plurality of square or rectangular receptacles which mate with corresponding bayonet projections on the head portion. Preferably there are three such square or rectangular receptacles, the center one of which is larger and deeper than the laterally spaced outer two receptacles. The two outside receptacles each connect or mate with a corresponding indentation in the sidewall of the cylindrical handle portion, when the head portion is connected to the handle portion. The head portion includes the three corresponding bayonet projections, with the center one of these bayonets being larger and longer than the two outside bayonets.

Furthermore, the center bayonet is a rigid structure, while the outside two bayonets are flexible. When the two portions are connected together, the center bayonet acts as a guide so that the outside bayonets and the mating protrusion and recess, respectively, are properly oriented to each other. As the two portions are pushed together the outside bayonets are flexed inward until such time as the bayonets are fully received in a respective aperture and an outer surface of each of the outer bayonets aligns with a respective recess in the sidewall of the handle portion. At this point the outside bayonets are resiliently urged outward so as to engage and seat in the recesses in the handle portion to securely lock the two portions together. The result is a quick-release connector for reliably and securely attaching a handle to a mop head or the like.

The principal objects of the present invention are: to provide an improved quick-release connector for connecting a handle to a mop head, broom head, or other tool, e.g., janitorial tools or the like; to provide such a connector which is quickly connected and released; to provide such a connector that requires no rivets, bolts, screws or similar time consuming fasteners; to provide such a connector which can be easily used by unskilled workers; to provide such a connector which is strong enough to withstand tensile, shear and torsional forces typically imposed on tools and handles during hand-held operation, including, for example vigorous use of mops and the like; to provide such a connector which is economically disposable; to provide such a connector which is readily adaptable to several different thicknesses and weights of mops; to provide such a connector which is easily and economically manufacturable; and to provide such a connector which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 2, 3, 4, 5:
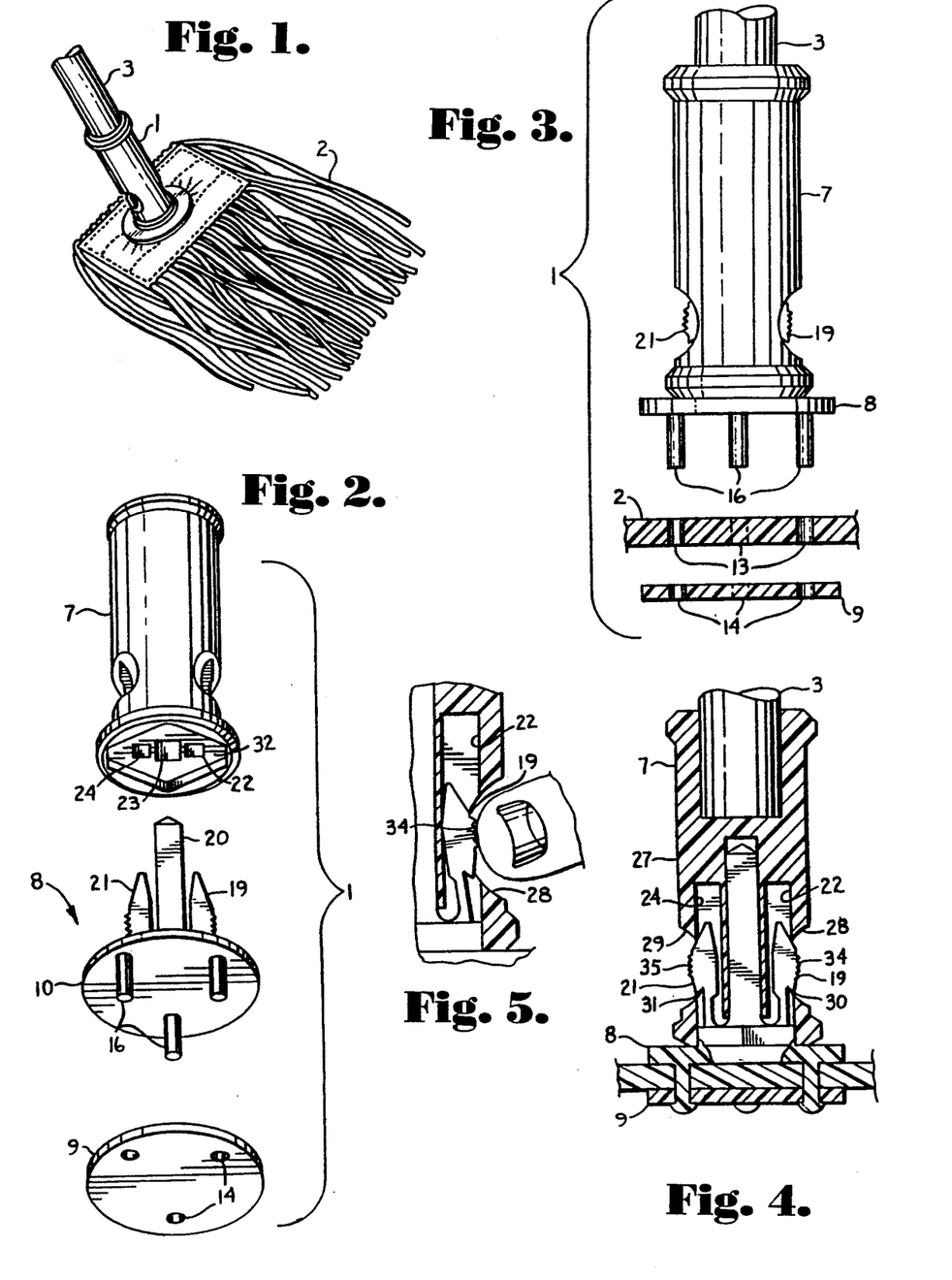
FIG. 1 is a perspective view of a connector in accordance with the present invention, shown with a mop head connected to a mop handle.
FIG. 2 is an enlarged and exploded perspective view of the connector.
FIG. 3 is a fragmentary and enlarged side elevation view of the connector and handle, showing a connector head portion partially exploded and with parts broken away to show interior detail.
FIG. 4 is an enlarged and fragmentary side elevation cross-sectional view of the connector, shown assembled without the details of the mop head and showing bayonets of the connector in a locked position, with portions broken away to show details thereof.
FIG. 5 is an enlarged and fragmentary side elevation view of the connector similar to FIG. 4 with one of the bayonets depressed by a user to an unlocked position and with portions broken away to show interior detail.

Referring to FIG. 1, there is shown a mop head 2 assembled to a mop handle 3 via a quick-release connector 1, in accordance with the present invention.

As illustrated in FIG. 2, the connector 1 has three major separable members that are a handle portion 7 and a head portion 8, comprising elements 9 and 10.

Figures 6, 7, 8, 9, 10, 11, 12, 13, 14:
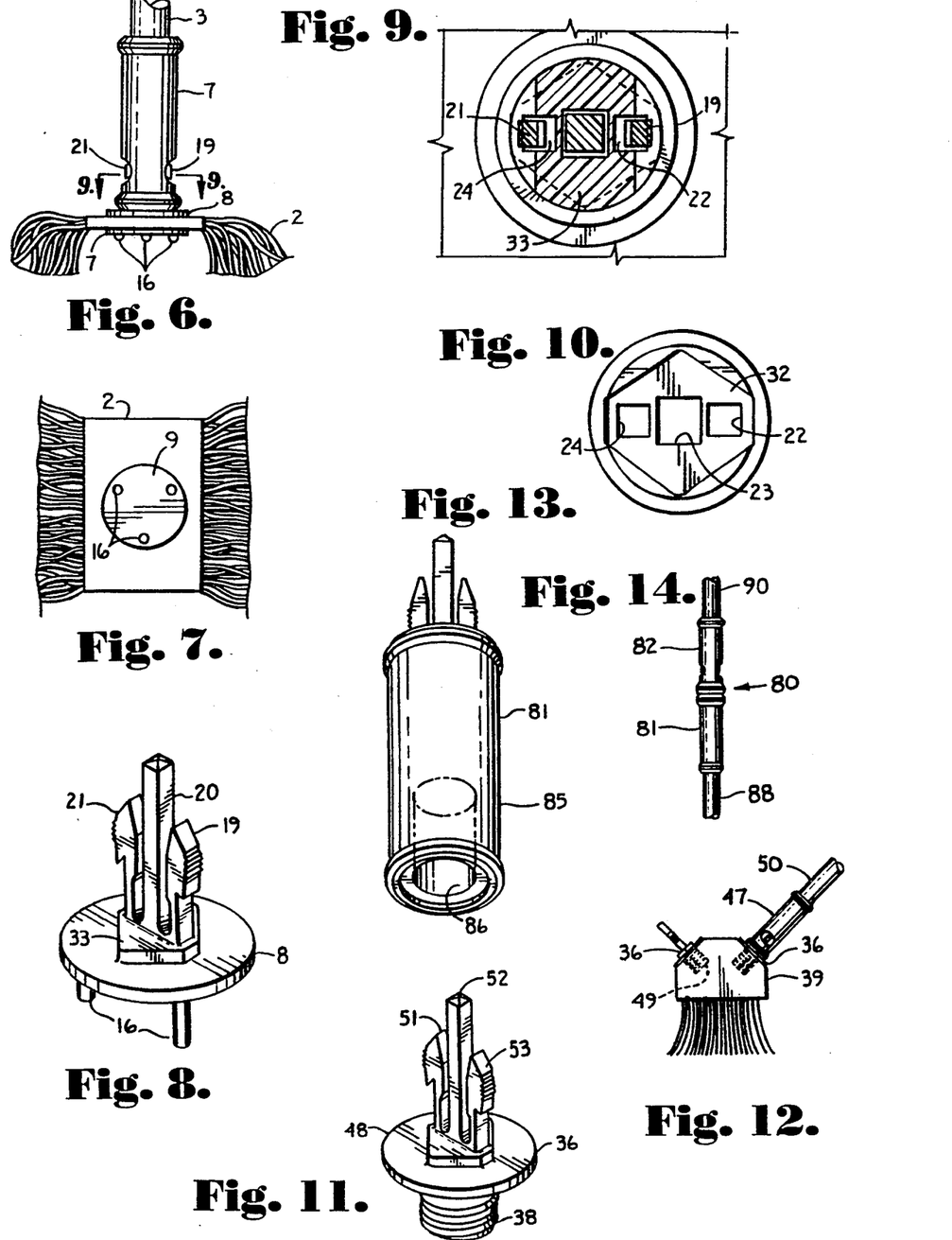
FIG. 6 is a side elevation view of a mop employing the connector with the connector shown fully assembled.
FIG. 7 is a bottom plan view of a mop head assembled to the head portion of the connector.
FIG. 8 is an enlarged perspective view of a top part of the head portion of the connector in a disassembled state.
FIG. 9 is an enlarged cross-sectional view of the connector, shown assembled and with a mating recess in a handle portion shown in phantom.
FIG. 10 is an enlarged bottom plan view of the handle portion of the connector in a disassembled state.
FIG. 11 is a perspective view of a head portion of a first modified connector having a threaded shaft for mating with a conventional broom handle or the like having a standard acme thread.
FIG. 12 is a reduced scale side elevation view of a broom head connected to a broom handle using the head portion of the connector shown in FIG. 11.
FIG. 13 is a perspective of a head portion of a second modified connector in accordance with the present invention having an annular section to receive a handle extension.
FIG. 14 is a reduced scale side elevation view of an extendable handle employing the connector shown in FIG. 13.

FIGS. 3, 6 and 7 best illustrate the assembly of the two head portion elements 9 and 10 to the mop head 2. FIG. 3 shows a portion of the mop head 2 illustrating three spaced and parallel apertures 13 through the top of the mop head 2. The mop head portion element 9 has three parallel and spaced apertures 14 that are spaced to coincide with the apertures 13. The mop head portion 8 has three parallel and elongate cylindrical pegs or prongs 16 integrally molded therein and extending outwardly therefrom. In assembling the head portion elements 9 and 10 to the mop head 2, the prongs 16 are inserted through the mating apertures 13 in the mop head 2 and then through the corresponding apertures 14 in the head portion element 9. The prongs 16 are then permanently seated in the apertures 14 via ultrasonic welding by swagging the distal end of each prong 16 to be larger than the apertures 13 and 14 or other permanent bonding techniques. FIGS. 6 and 7 illustrate the completed mop head 2.

The complete mop head 2 is then easily and quickly connectable to the mop handle 3 by inserting three elongate projections or bayonets 19, 20 and 21 into three corresponding respective bayonet receiver receptacles 22, 23 and 24 in the handle portion 7. The outer bayonets 19 and 21 are relatively thin and flexible, and, as the handle portion 7 is pushed onto the head portion 8, the outer bayonets 19 and 21 flex inwardly to permit the two connector portions 7 and 8 to be pushed together by a user. The central bayonet 20 is rigid and mates within a cavity formed by a series of webs formed in the female fitting. It has been found that, in many applications, the central bayonet 20 may be omitted and that the outer bayonets 19 and 21 more than adequately support the connection between a tool head and a connector 1, as clearly shown in FIG. 20. In this configuration, certain of the internal webs, as best illustrated in FIG. 4, the head portion 7 has two slots or indentations 28 and 29 located in a cylindrical sidewall 27 thereof.

The indentations 28 and 29 connect with and open into respective bayonet receptacles 22 and 24, and are positioned so as to permit the flexible bayonets 19 and 21 to be urged outwardly into the indentations 28 and 29 by the natural resiliency of the bayonets 19 and 21 once the two portions 7 and 8 are pushed far enough together into a locked and operational configuration.

The bayonets 19 and 21 have shoulders or ledges 30 and 31 and radially outwardly extending knurled surfaces 34 and 35 molded therein. Again, as illustrated in FIG. 4, once the connector portions 7 and 8 are pushed together, the ledges 30 and 31 overlap and mate with the lower sides of the indentations 28 and 29, respectively, as the flexible bayonets 19 and 21 are resiliently urged outwardly. This provides a positive locking feature so that the portions 7 and 8 are kept securely fastened together.

FIG. 5 illustrates how to separate the two portions 7 and 8 by a release technique wherein an operator aligns a finger with the indentation 28, contacting the knurled surface 34 of the flexible bayonet 19, urging the bayonet 19 inward while simultaneously doing likewise to the bayonet 21 so that the bayonet leges 30 and 31 clear the sides of the indentations 28 and 29 and are fully within the receptacles 22 and 24 respectively such that the portions 7 and 8 can be easily pulled apart by sliding the bayonets 19 and 21 along the receptacles 22 and 24 respectively. The knurled surface 34 provides an antislip function for the operator's finger. The bayonet 20 is rigid and significantly larger and longer than the flexible bayonets 19 and 21. Thus, the insertion of the rigid bayonet 20 into the bayonet receptacle 23, which is wider and deeper than the other receptacles 22 and 24, acts to properly orient and guide the flexible bayonets 19 and 21 into their respective receptacles 22 and 24. The rigid bayonet 20 also adds considerable strength and rigidity to the assembled structure.

Another important feature of the connector 1 is illustrated in FIGS. 2, 8, 9 and 10. As shown in FIG. 2, the handle portion 7 has incorporated on its bottom surface a diamond-shaped recess 32. The head portion 8, as best illustrated in FIG. 8, has a matching diamond-shaped protrusion 33. When the handle portion 7 is assembled to the head portion 8, the protrusion 33 is received into the recess 32. This is illustrated in FIG. 9 where the periphery of the recess 32 and the protrusion 33 are shown in phantom lines. This mating of the protrusion 33 with the recess 32 substantially adds to the strength and rigidity of the structure, particularly in resisting the considerable torsional stresses that are imposed on the mop head 2 during use. Note that during assembly, the rigid bayonet 20 and the bayonet receptacle 23 also act as guides for the mating of the protrusion 33 with the recess 32.

FIGS. 11 and 12 illustrate another embodiment of the quick-release connector head portion generally represented by the reference numeral 36 that has an axially depending projection 38 that incorporates standard acme threads for mating with a broom head 39, although it is foreseen that the connector 36 may be used in conjunction with a paint roller or the like. In this embodiment, a handle portion 47 would be generally the same as the handle portion of the previous embodiment and as shown in FIGS. 1 through 10, with only a head portion 48 modified. The head portion 48, rather than incorporating the three prongs of the previous embodiment, has molded therein the threaded projection 38.

FIG. 12 illustrates one use for the connector embodiment of FIG. 11 where two of the head portions 48 are threaded into the female threaded receptacles 49 of the standard push-broom head 39. A broom handle 50 incorporating a connector head portion 47 can at the desire of the user be rapidly connected to either side of the broom head 39. This also serves to eliminate the annoying instances of wooden broom handles snapping off and leaving their threaded portions embedded in broom heads and other implements. The connector embodiment illustrated in FIG. 11 can also be used with standard paint rollers, asphalt driveway brushes, and any other implement which incorporates standard acme threads as a connector. Bayonets 51, 52 and 53 extend from the head portion 48 opposite the threaded projection 38.

It is foreseen that the connector 36 can also be used as a part of a modular tool component system. It is well known that long-handled tools such as brooms, rakes, shovels, hoes, tree saws and the like can occupy a large amount of space within a garage or storage shed. The working implement heads of a plurality of such long-handled tools could be fitted with the head portion 48 of the connector 36 as is illustrated in FIG. 11, and a single handle equipped with a mating handle portion 47, as is illustrated in FIG. 12, could be used with all of the tools. This would substantially reduce the storage requirements of these tools. It is possible that a plurality of such tools could be packaged and marketed as a set, possibly fitted to a complimentary bracket for mounting on a wall, and complete with one or more modular handles.

FIGS. 13 and 14 illustrate a third embodiment of a quick-release connector generally designated by the reference numeral 80. FIG. 13 illustrates a male connector handle portion 81 of the connector 80 which is designed to mate with a female connector handle portion 82 of the type such as is illustrated in greater detail in FIGS. 1 through 10. This embodiment is generally similar to the embodiment of FIG. 11, except that the threaded protection of the prior embodiment is replaced with a hollowed cylindrical extension 85 which has a circular bore 86 to accommodate another handle section 88. FIG. 14 shows how the male handle portion 81 mates with the female handle portion 82 to create an extendable handle 90 for use with ceiling paint rollers and similar implements which require longer than normal handles. The considerable strength and rigidity of this connector is highly advantageous in creating a lengthy extension handle.

Figures 15, 15A, 15B:
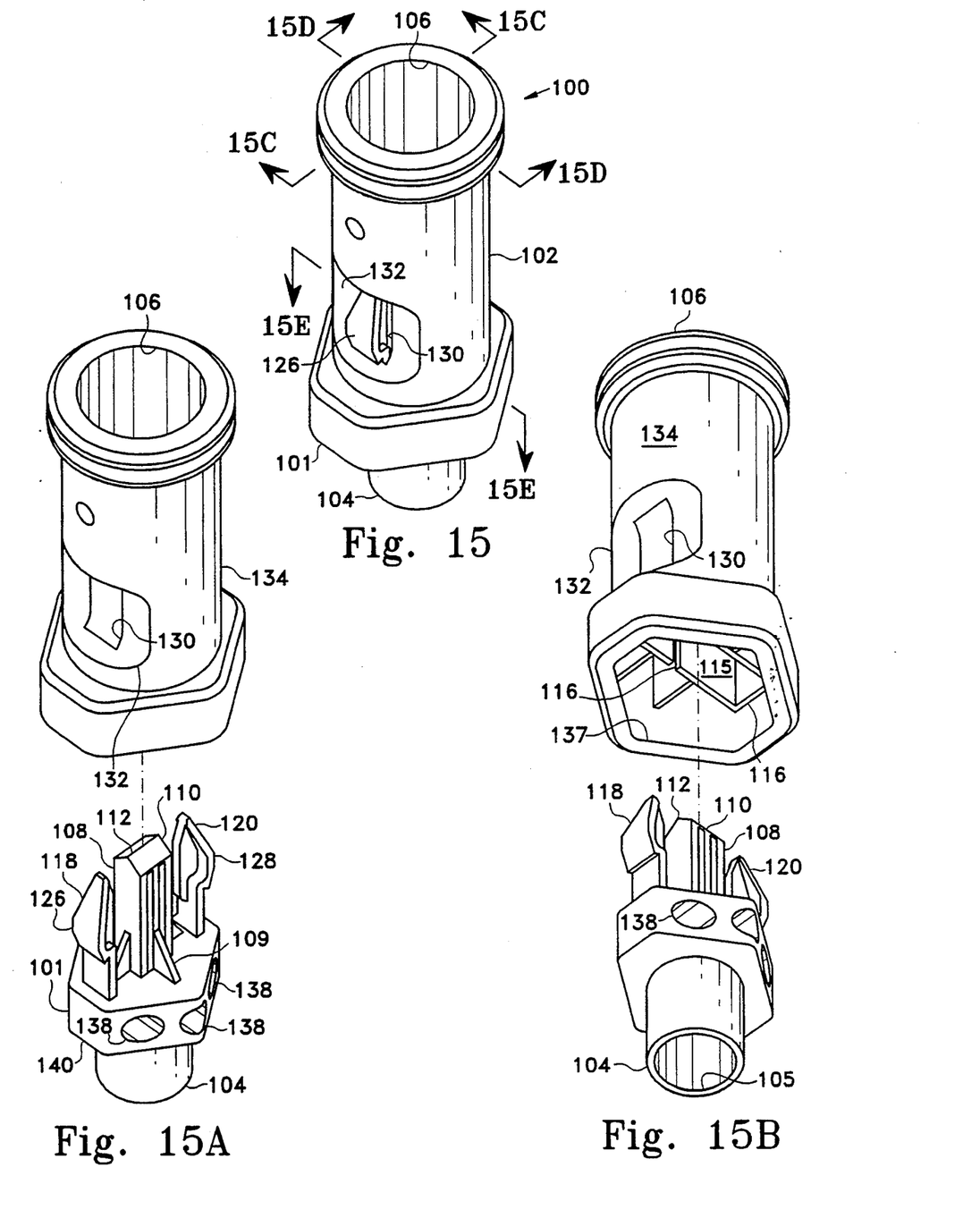
FIG. 15 is a perspective view of an assembled connector according to the present invention.
FIG. 15A is an enlarged exploded perspective view of a connector according to the present invention exposing principally the male fitting of the two-part connector.
FIG. 15B is an enlarged exploded perspective view of the connector FIG. 15, shown disassembled and exposing principally the female fitting of the two-part connector.
Figure 20:
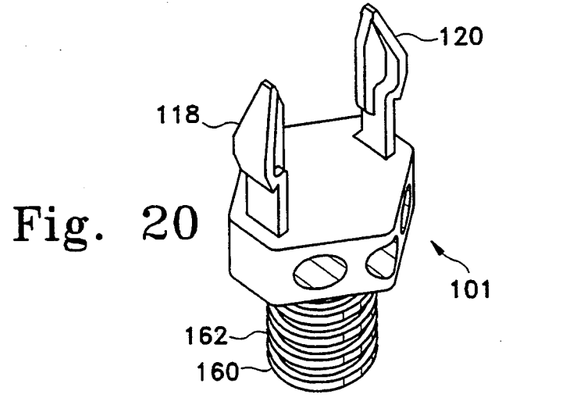
FIG. 20 is a perspective view of an alternative embodiment of the male fitting of FIG. 19.

Referring now to FIG. 15, there is shown a quick-release connector 100 in accordance with the present invention, which includes a male fitting 101 of unitary integral molded design mated in a female fitting 102. The male fitting includes a downwardly projecting cylindrical member 104 having a cylindrical cavity 105 for fastening to an implement handle and the female fitting 102 has a cylindrical opening or cavity 106 for receiving a handle to be connected to an implement or tool. Referring to FIG. 15A, the male fitting 101 includes a rigid central upward projecting bayonet 108, having a tip 110 including a locating wedge 112 for mating with a cavity 114 formed by certain webbing 116 in the lower portion of the female fitting 102 (see FIG. 15B). The central bayonet 108 is reenforced by four upstanding triangular skirt members 109, which are equally spaced about the perimeter of the central bayonet 108. The male fitting member 100 further includes a pair of outer bayonets 118, 120, which are flexible and engage mating cavities 122, 124 in the lower portion of the female fitting 102 (22, 24, FIG. 10). The outer bayonets include outwardly projecting curve portions 126, 128 respectively, which extend beyond the side wall 134 through slots 130 in an indented portion 132 of the side wall 134 of the female fitting 102. In use, the worker depresses the outer bayonets 118, 120 at the curved portions 126, 128, thereby releasing the bayonets 118, 108 and 120, allowing the male fitting and female fitting to disengage. A base portion 135 of the female fitting 102 includes a 6 sided receptacle 137 or cavity that receives a mating 6 sided base 140 of the male fitting 101. The patterns of the bases may be any desired pattern, but it has been found that the irregular hexagonal shape illustrated in the Figures provides good stability between the male and female fittings of the connector 100. It is this fitting together of these two pieces, which are manufactured to very close tolerances, that provides much of the lateral stability of the connector 100 and allow the central bayonet 108 to be omitted from the connector 100 without deleterious effects (FIG. 20).

Figures 22, 23:
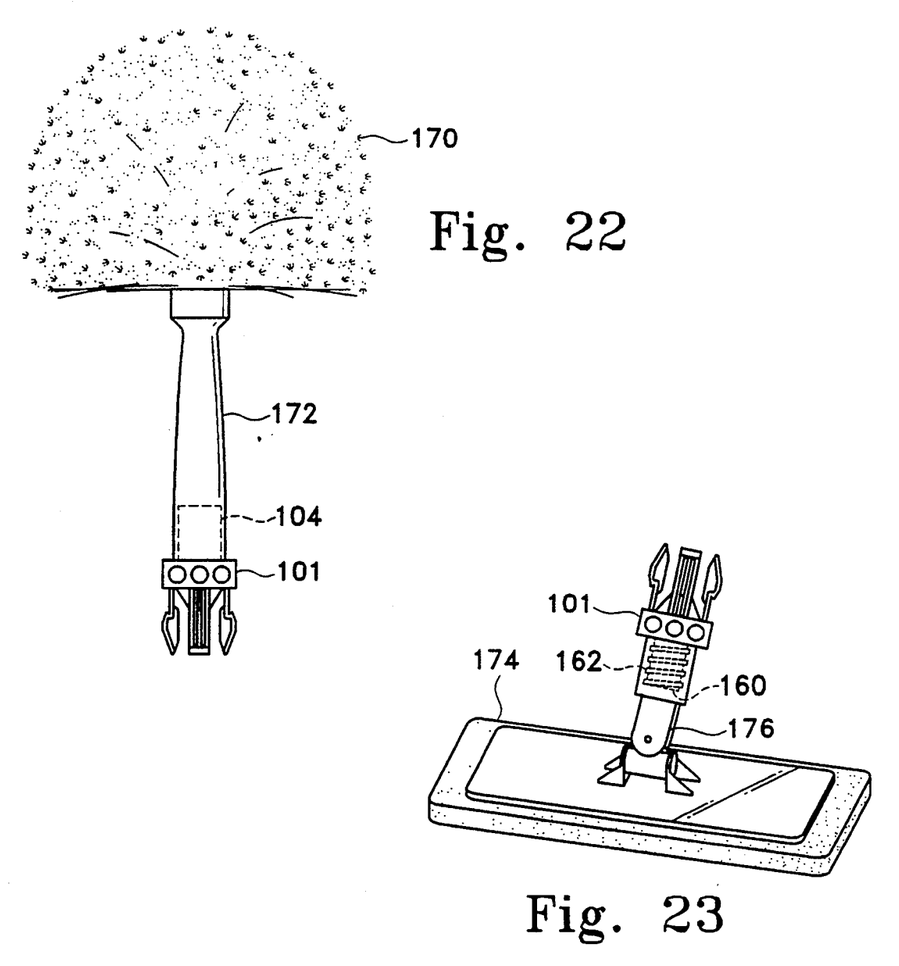
FIG. 22 is an elevation of a feather duster attached to a male fitting of the connector of the present invention.
FIG. 23 is a perspective view of a sponge mop head fastened to a connector according to the present invention.
Figure 26:
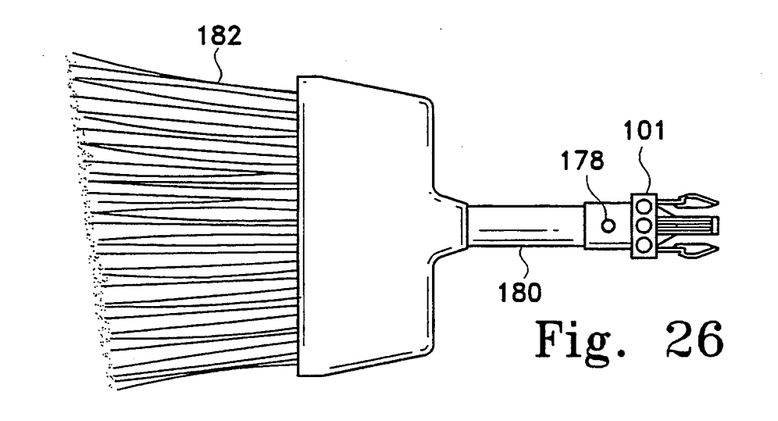
FIG. 26 is an elevation of a flat-headed broom fastened to a male fitting of the connector of the present invention, having a tubular extension for receiving a solid handle, such as the fitting shown in FIG. 15.

As shown in FIG. 15B, a hollow cylindrical depending fixture 136 is integrally formed on the male fitting 101 to permit connection of the male fitting 101 to an implement handle, such as shown in FIG. 22 or 26. A plurality of apertures 138, preferably three in number, are located in a base portion 140 of the male fitting 101. These apertures 138 are designed to reduce the amount of material used in the fitting 101 and to enhance cooling of the molded fitting 101 after molding.

Figure 15C:
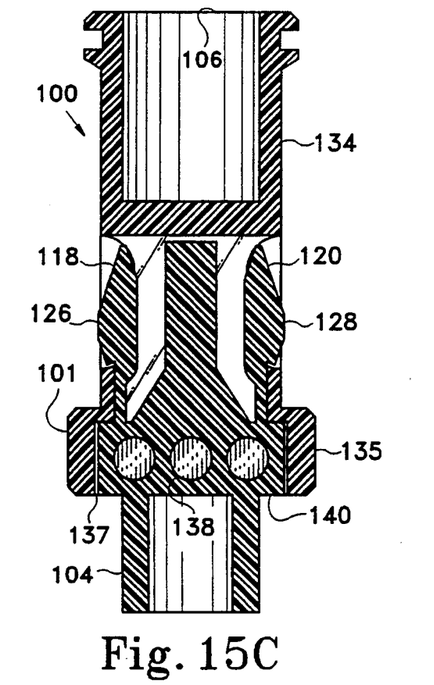
FIG. 15C is a cross sectional view of the connector of FIG. 15 taken along line 15C—15C.
Figure 15D:
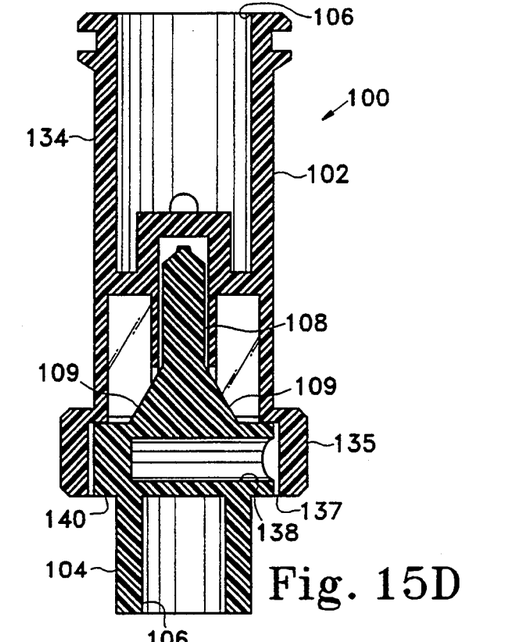
FIG. 15D is a cross sectional view of the connector of FIG. 15 taken along line 15D—15D.

FIGS. 15C, 15D show the quick release connector 100 in cross sectional views that illustrate the engagement of the bayonets and the receiving cavities.

Figure 15E:
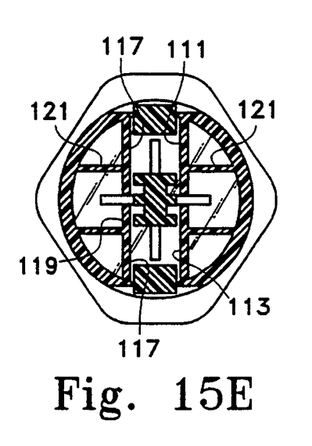
FIG. 15E is a cross sectional view of the connector of FIG. 15 taken along line 15E—15E.

Referring now to FIG. 15E, a central bayonet receiving cavity 119 is formed by the webbing 116, and outer bayonet receiving cavities 111, 113, respectively, are formed by the webbing 117. Reenforcing webbing 121 allows the female fitting 102 of the quick-release connector 100 to used reduced amounts of materials while retaining the strength required for vigorous and forceful use of implements connected to handles by the quick-release connector 100.

Figure 16:
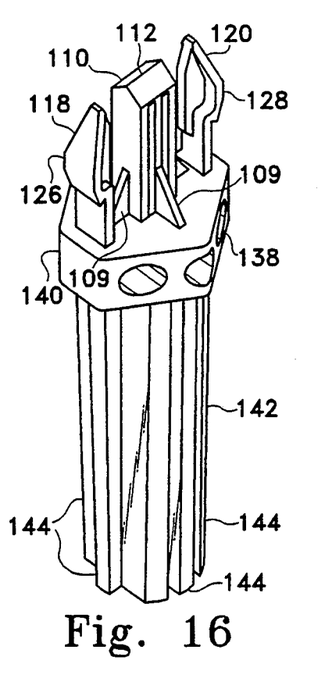
FIG. 16 is a perspective view of an alternative embodiment of a connector according to the present invention having a tapered ribbed handle insertion member formed on one end, for fastening the connector to a hollow tool handle.
Figure 16A:
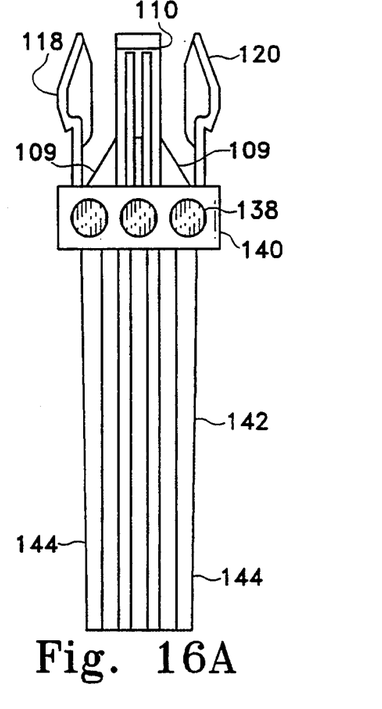
FIG. 16A is a side elevation of the connector of FIG. 16.
Figure 16B:
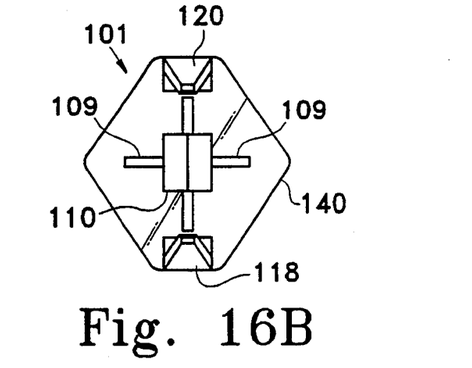
FIG. 16B is an top plan view of the connector of FIG. 16.
Figure 16C:
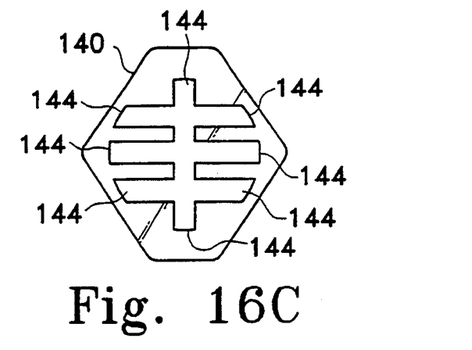
FIG. 16C is a bottom plan view of the connector of FIG. 16.

FIGS. 16 and 16 A illustrate an alternative embodiment of the male fitting 142, in which an elongated downward projecting ribbed and tapered tool-handle engaging member provides an integrally formed extension from the base 140, includes vertical ribs 144, which allow the male fitting 142 to be press fitted into a hollow implement handle. FIGS. 16B and 16C illustrate top and bottom plans of this embodiment, as described above in the Brief Description of the Drawings section of this specification.

Figure 17:
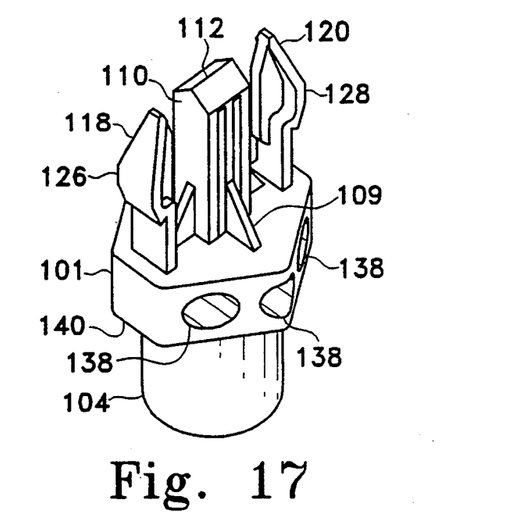
FIG. 17 is a perspective view of the male fitting of a connector according to the present invention, having a tubular pipe-like extension for insertion into hollow tool handles or for sliding over solid tool handles.
Figure 17A:
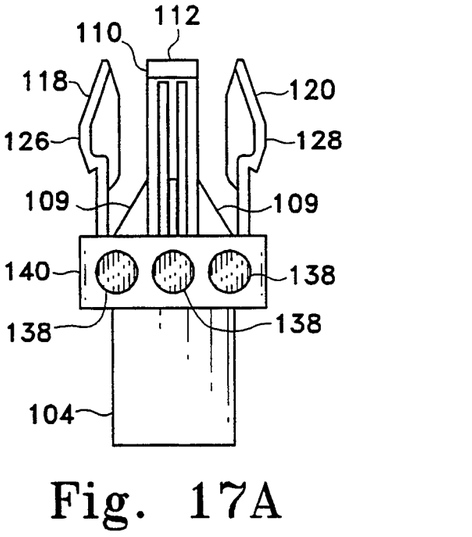
FIG. 17A is an elevation of the connector fitting of FIG. 17.
Figure 17B:
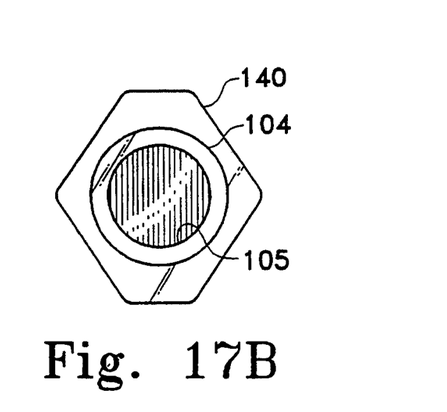
FIG. 17B is a bottom plan view of the fitting of FIG. 17.
Figure 17C:
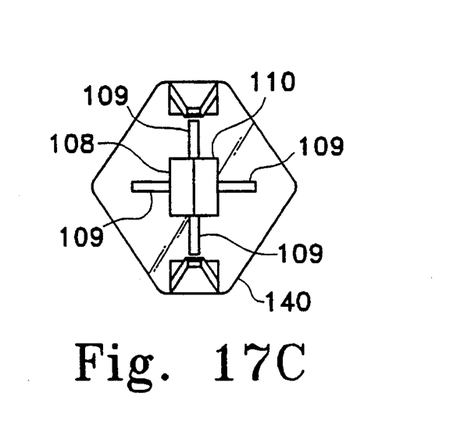
FIG. 17C is a top plan view of the fitting of FIG. 17.

Referring now to FIGS. 17-17C there is shown the male fitting 101 portion of the quick-release connector, as shown in FIG. 15.

Figure 18:
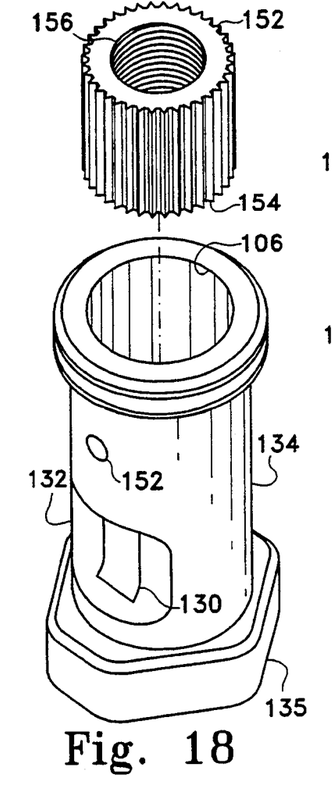
FIG. 18 is a perspective view of an alternative embodiment of a female connector according to the present invention, which includes a ribbed cylindrical insert (shown exploded) for gripping a tool handle.

Referring now to FIG. 18, there is shown an alternative embodiment of the female fitting 102, in which a ribbed sleeve insert 152 having internal female Acme threads 156 and external vertical ribs 154 is shown exploded from the actual female fitting 102, having a cylindrical cavity 106 for receiving the insert 144, which is press fitted into the cavity 106 for allowing threaded handles to be quickly fixed to the female fitting 102 of a quick-release connector 100 according to the present invention. Interior details of this embodiment are revealed in FIG. 18C, while the assembled female fitting 102 having female Acme threads 156 is shown in perspective view in FIG. 18A.

Figure 18A:
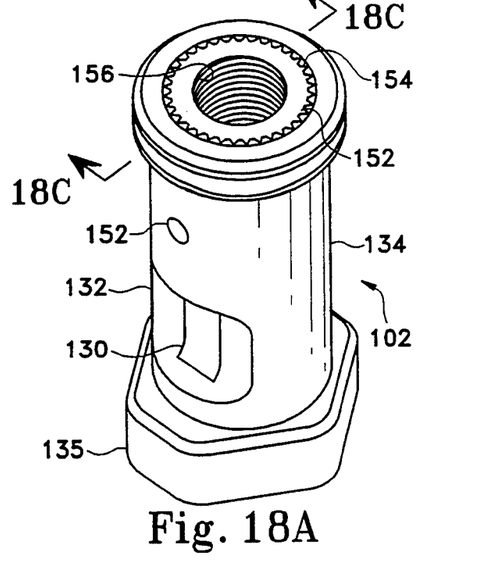
FIG. 18A is a perspective view of the female connector of FIG. 18.
Figure 18B:
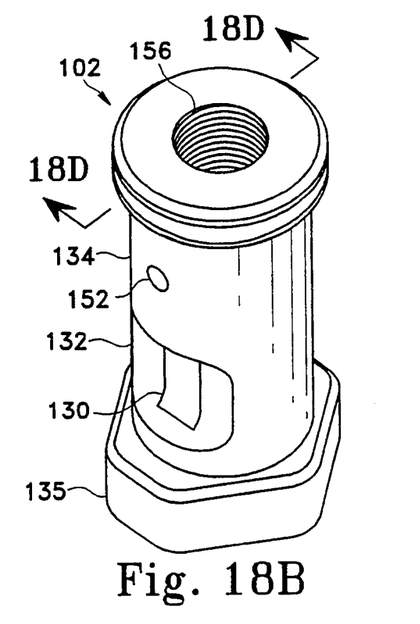
FIG. 18B is a perspective view of an alternative embodiment of the connector fitting of FIG. 18 in which the handle gripping member is integrally formed with the female connector fitting itself.
Figure 18C:
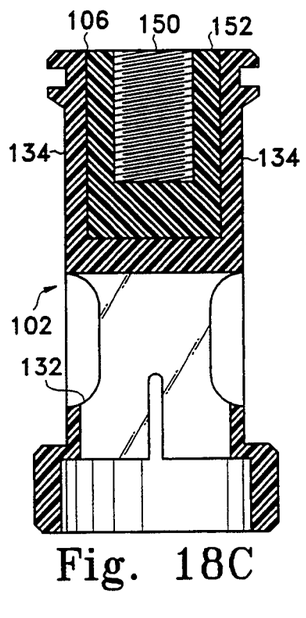
FIG. 18C is a cross sectional view of the fitting of FIG. 18A taken along line 18C—18C.
Figure 18D:
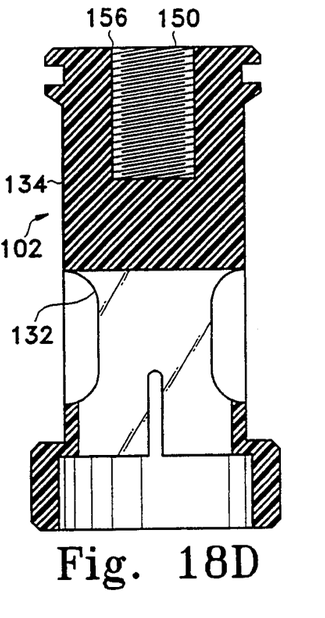
FIG. 18D is a cross sectional view of the fitting of FIG. 18B taken along line 18D—18D.

FIGS. 18B and 18D illustrate a similar female fitting 102 having integrally molded interior female Acme threads 156. Each embodiment is shown with a threaded tool or implement handle 150 threaded into the Acme threads 156. The sleeve insert model of FIGS. 18, 18A and 18C helps reduce inventory of different fittings that must be carried, whereas the model with integrally formed threads 148, FIGS. 18B, 18D, may provide a more pleasing appearance to some users. As shown in FIGS. 18, 18A, and 18B a hole 152 is located in the side wall 134 of the female fitting 102 in the cavity 106 and the hole 152 penetrates the entire side wall 134, to allow easy insertion of a screw or other fastener to permanently, or more firmly fasten a tool handle to the female fitting 102.

Figure 19:
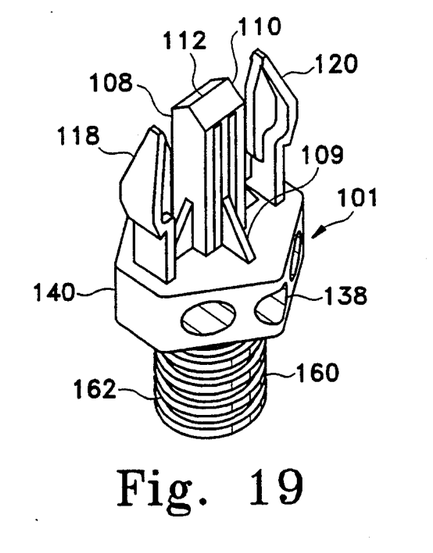
FIG. 19 is a perspective view of a male fitting according to the present invention having a downward projecting member with male Acme threads.
Figure 19A:
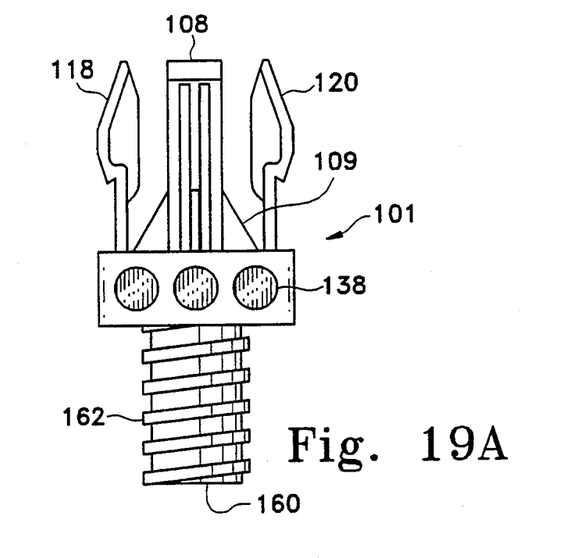
FIG. 19A is an elevation of the fitting of FIG. 19.
Figure 25:
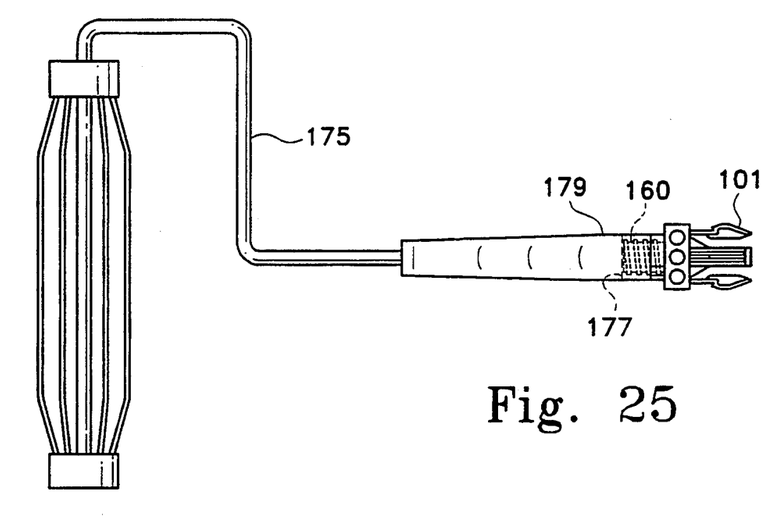
FIG. 25 is an elevation of a conventional paint roller having a handle portion, which is fastened to a male fitting of the connector of the present invention, such as shown in FIG. 20.
Figure 32:
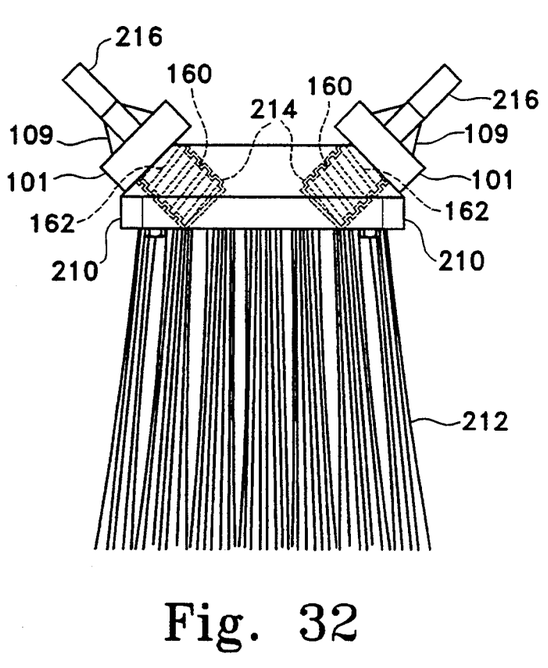
FIG. 32 is an end elevation of the push broom of FIG. 32.

Referring now to FIGS. 19, 19A, there is shown a male fitting 101 having a downward projecting cylindrical solid stem 160 that carries external male Acme threads 162, which allows the fitting 101 to be quickly and easily attached to an implement handle having mating female Acme threads, see for example, FIGS. 23, 25 and 32.

Referring now to FIG. 20, there is shown a male fitting 101 for use with the quick-release connector 100 according to the present invention, in which only two outer bayonets 118, 120 are employed, as described above, and from which the large central bayonet member has been omitted, which, it has been found, does not impede the performance of the quick-release disconnect device 100.

Figure 21:
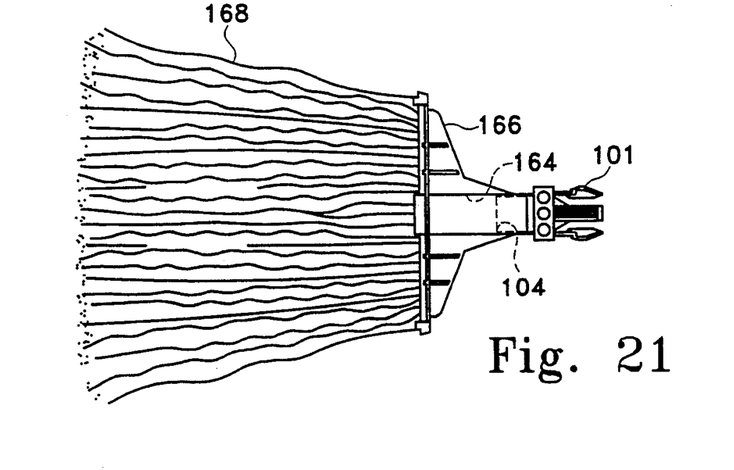
FIG. 21 is an elevation of a mop head attached to a male fitting member according to FIG. 15.

FIG. 21 shows the male fitting 101 fixed to a mop head by inserting the cylindrical base portion 104 into the hollow handle receiving cavity 164 of the mop head 166, which in turn holds the actual mop 168. FIG. 22 illustrates the same embodiment of the male fitting 101 fixed to a feather duster 170 having a hollow handle 172,. In either case, the fitting 101 may be secured with adhesive, one or more screws or simply a press-fit friction fitting between the respective pieces.

Figure 24:
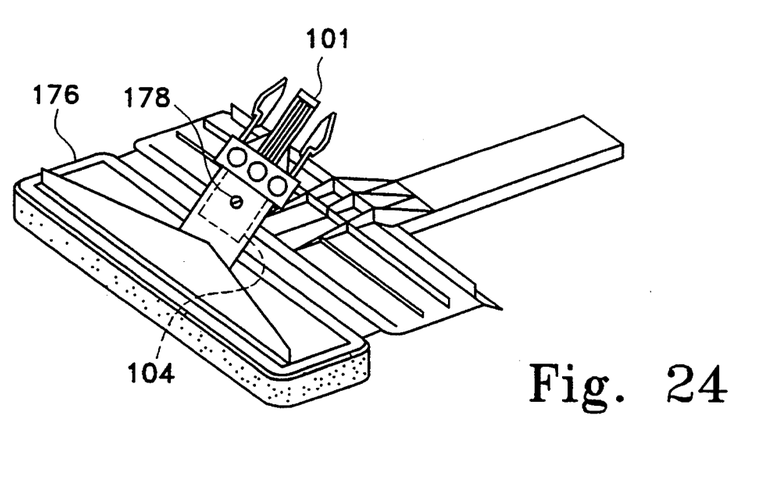
FIG. 24 is a perspective view of a different type of sponge mop head fastened to a connector according to the present invention, wherein the mop head includes a self-contained mop-squeezing portion.

FIG. 24 shows the Acme threaded fitting 101 of FIG. 19, 19A fixed to a sponge mop head 174 by threading into a mop handle 176 having female Acme threads, and FIG. 24 illustrates the fitting 101 of FIG. 17 fixed to a self-squeezing sponge mop 176 by a screw 178.

FIG. 25, previously discussed, shows the Acme threaded fitting 101 of FIGS. 19, 19A fixed to a paint roller handle assembly 175 by threading the external Acme thread 162 on the stem 160 into the mating female internal Acme thread 177 of the handle 179 of the paint roller handle assemble 175.

Figure 27:
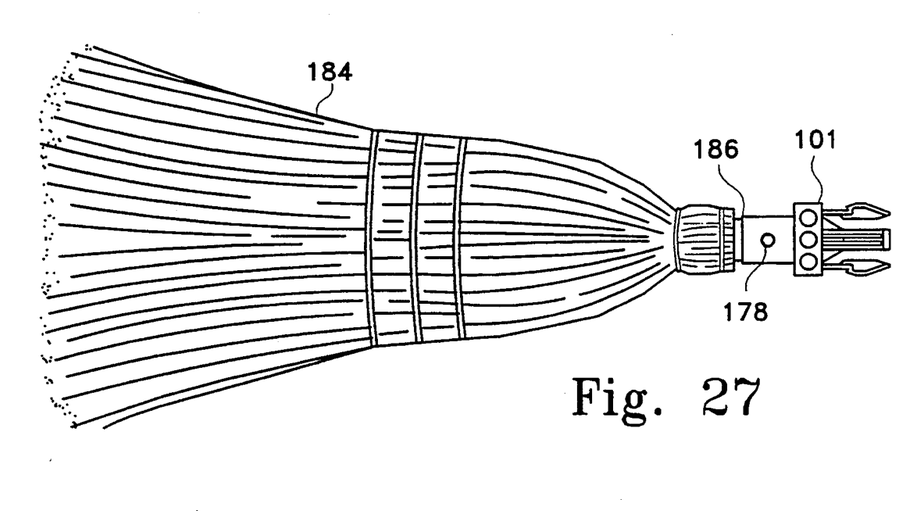
FIG. 27 is an elevation of a conventional corn broom fastened to a male fitting of the connector the present invention, having a tubular extension for receiving a solid handle, such as the fitting shown in FIG. 15, and fixed into place with a fastener, such as a screw.
Figure 28:
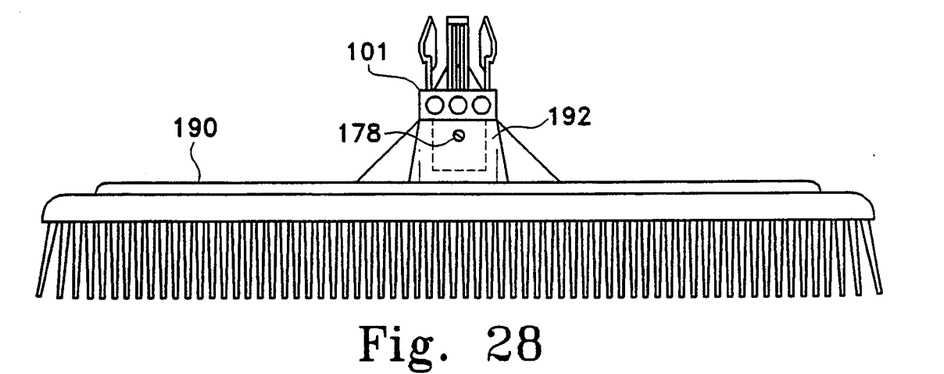
FIG. 28 is a front elevation of a push-broom having rubber-bristles, which is connected to a male fitting according to the connector of the present invention.
Figures 29, 30:
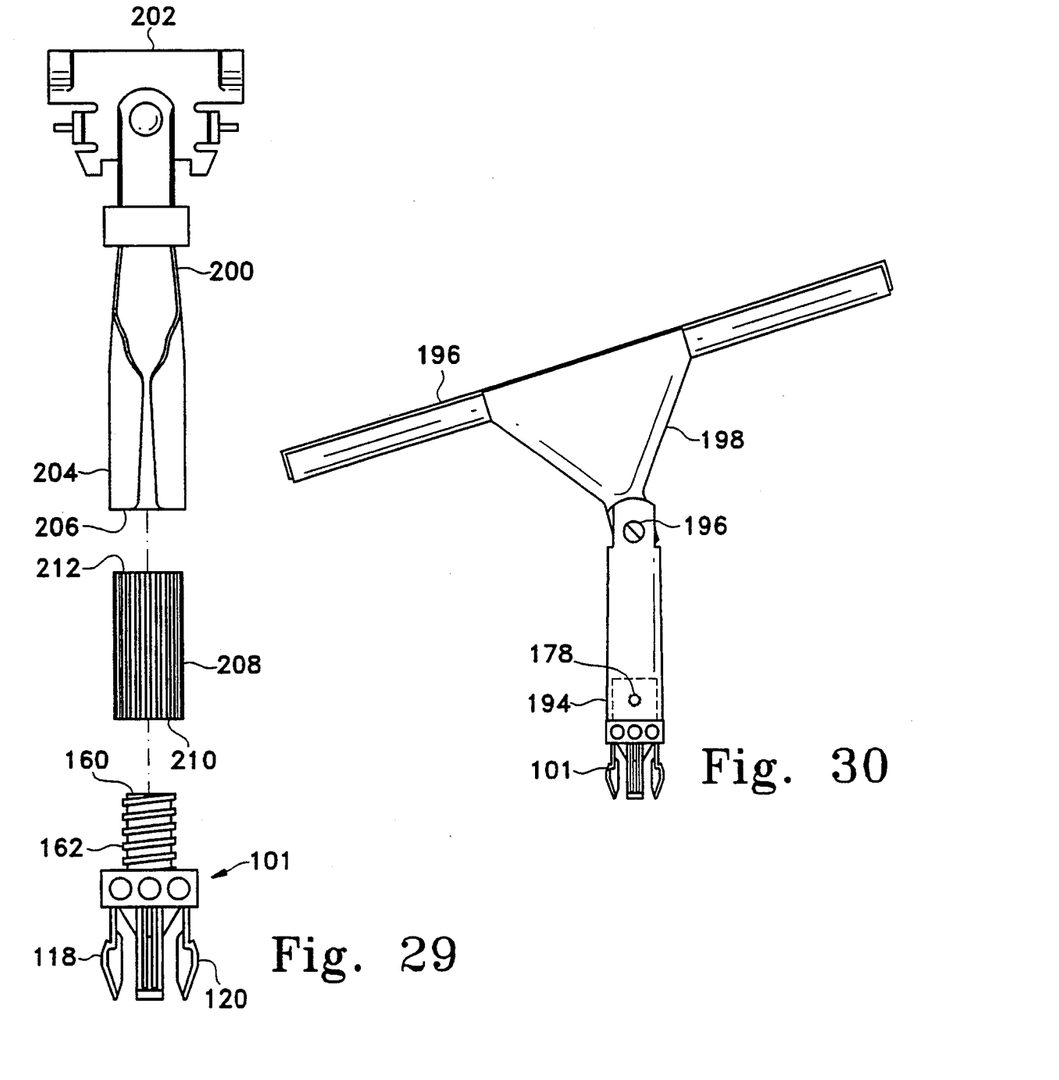
FIG. 29 is an explored elevation of a tool handle that is to be fastened to a male fitting of the connector of the present invention, which includes a ribbed friction engaging sleeve having internal female Acme threads for receiving the male Acme threads of the male fitting, all according to the present invention.
FIG. 30 is an elevation of a squeegee having a handle connected to a male fitting of the connector of the present invention, such as the male fitting shown in FIG. 17.
Figure 31:
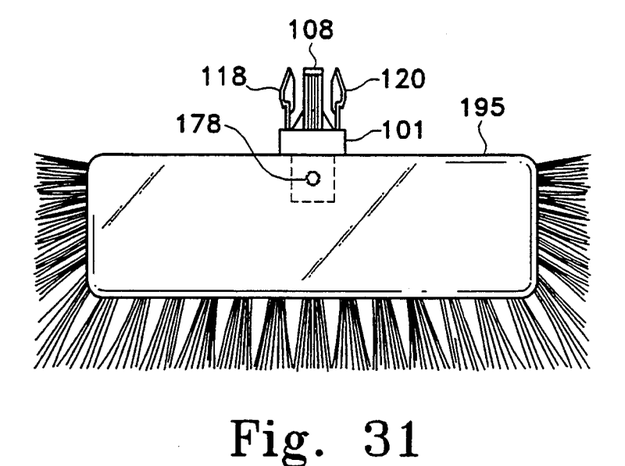
FIG. 31 is a top plan view of a push broom connected to a male fitting of a connector according to the present invention.

FIG. 26 shows the male fitting 101 of FIG. 17, fastened to a handle 180 of a conventional square broom 182 by a screw 178, with the handle 180 inserted into the hollow cylindrical portion 105 (e.g., FIG. 15B). FIG. 27 shows the same arrangement described in connection with FIG. 26, but with a corn broom 184, with the broom handle 186 being cut short to accept the male fitting 101 close to the head of the broom 184. FIG. 28 illustrates the use of the fitting 101 of FIG. 17 to secure a bristle-push broom 190 to a handle-receiving handle portion 192 of the bristle-push broom 190, where the connection between the fitting 101 and the bristle-broom 190 is secured by the screw 178. FIG. 30 shows the same arrangement in which the male fitting 101 is secured inside a hollow handle 194 to a squeegee 196, having an articulating head 198 pivotally connected to the handle 194 by the screw fitting 196. FIG. 31 shows the male fitting 101, as shown in, e.g., FIGS. 28, 30, attached to a conventional push broom head 195, having a plurality of bristles 195, and fastened by a screw 178. Most janitorial tools, especially mops and brooms, wear out long before the handles, and the fitting 101 can easily be removed from one tool, such as the broom 195 and placed onto another tool. Further, Acme threads in wooden push brooms often wear out prematurely, especially when the handle is not kept tightly screwed in, and will not then hold a threaded wooden handle. At that point, the broom head becomes worthless and must be discarded. The male fitting 101 can alleviate this problem by allowing such broom heads to remain in service by inserting the fitting 101 into a worn out broom socket, and by inserting the fitting 101 into new brooms, thereby preventing the threaded socket from experiencing any wear.

FIG. 29 illustrates an exploded view of tool head 200, having gripping jaws 202 capable of holding a variety of tools, such as mops, dusters, squeegees, and so forth, and further having a hollow handle 204 with a smooth bore 206. A hollow sleeve insert 208 includes a plurality of closely spaced parallel vertical friction ribs 210 and internal female Acme threads 212. The sleeve insert 208 is press fitted into the hollow handle 204 and the external male Acme threads 162 on the stem 160 are threaded into the sleeve insert 208.

FIG. 32 shows a side elevation of a push broom head 210 having a plurality of bristles 212 and a pair of opposing internally threaded broom handle receiving sockets 214, for receiving external male Acme threads of a handle. The male fitting 101 as shown in FIG. 29 or FIG. 20 can simply be screwed into the sockets 214 by using the external male threads 162 on the stem 160. The male fittings 101 are then connected to the female fittings 102, as shown and described above, an a tool handle 216 is inserted into the handle receiving cavities 106, as shown and described above.

Figure 33:
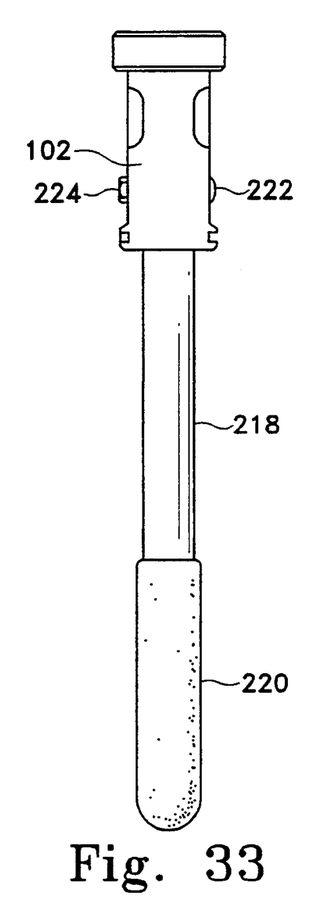
FIG. 33 is an elevation of a tool handle fitted with a female fitting of the connector according to the present invention.

FIG. 33 shows a tool handle 218, preferably tubular, and having a high-friction comfort hand grip 220 on one end, and a female fitting 102, as described previously attached thereto by a screw 222 fastened by a nut 224. FIG. 33 illustrates how a single handle fitted with the female fitting 102 of a quick-release disconnect coupling 100 according to the present invention allows the same handle to be used with a large number of tools, including all those shown and described above and many others not shown specifically in these drawings or described in this specification.

Preferably the connectors of the present invention are constructed of nylon which possesses a high strength-to-weight ratio and is readily bondable by conventional ultrasonic welding techniques. It is foreseen that other thermoset resins or the like may be used with equal effectiveness. Such materials are readily molded into the desired shapes and are economical enough to permit their disposal with used mop heads and the like.

While quick-connectors described herein have been described as usable with a mop or broom, it should be apparent that such could be used in any device requiring connection between two elements such as belts, wires, straps, etc. Furthermore, it is seen that the prongs may be sharpened to penetrate mop heads or other implements which do not incorporate mating apertures. The connector device of the present invention is readily adaptable to different weights and thicknesses of mop heads or other implements merely by changing the diameter and thickness of the connector portions.

It is to be understood that while certain forms of the present invention have been illustrated and described herein, it is not to be limited to the specific forms or arrangement of parts described and shown.

What is claimed and desired to be secured by Letters Patent is as follows:

1. A quickly attachable and detachable connector for connecting a handle to a working head, comprising:
   (a) a female fitting having a handle-connecting portion at one end and a plurality of bayonet receiving receptacles at a bayonet receiving end of said female fitting enclosed within a plurality of side walls; an indentation in at least two opposing said side walls and a bayonet tip receiving slot within each said indentation; a plurality of web members within said bayonet receiving end, said web members further comprising means for guiding and receiving bayonet members from a male fitting; with one said web member extending parallel to and coextensive with each said bayonet receiving slot and offset from each said bayonet receiving slot toward a center of said female fitting; and
   (b) a male fitting having a working head receiving end and a bayonet end comprising a central rigid bayonet flanked by a pair of flexible resilient bayonets adapted to seat within said bayonet receiving slots of said female fitting wherein said central rigid bayonet further comprises four reenforcing flanges, each said reenforcing flange having a triangular shape connected to a lower portion of said central rigid bayonet and to a floor of said bayonet end of said male fitting.

2. A quickly attachable and detachable connector for connecting a handle to a working head according to claim 1 wherein said web members of said female fitting further comprise at least one slot, said slot further comprising means for receiving one said reenforcing flange.

3. A quickly attachable and detachable connector for connecting a handle to a working head according to claim 1 wherein each of said flexible resilient bayonets further comprises an inwardly curved portion adjacent to a tip for easing insertion into said bayonet receiving receptacles, a gripping ledge immediately adjacent to a lower portion of said curved portion, and a straight portion between said gripping ledge and a floor of said bayonet end of said male fitting, with said flexible resilient bayonets and said female fitting cooperating to deflect and urge both said flexible resilient bayonets toward a center of the connector during insertion, said curved portions of said flexible resilient bayonets being received in said bayonet receiving slots, whereupon each said flexible resilient bayonet is urged outward from a center of the connector by its elasticity and said gripping ledge of each said flexible resilient bayonet engages an upper edge of each said bayonet receiving slot, thereby preventing disengagement of said male fitting from said female fitting.

4. A quickly attachable and detachable connector for connecting a handle to a working head according to claim 1 further comprising a separating wall between said handle connecting portion and said receptacles of said female fitting.

5. A quickly attachable and detachable connector for connecting a handle to a working head according to claim 1 wherein said floor portion of said male fitting further comprises a plurality of parallel bores parallel to an upper surface of said floor.

6. A quickly attachable and detachable connector for connecting a handle to a working head comprising:
   (a) a female fitting having a handle-connecting portion at one end and a plurality of bayonet receiving receptacles at a bayonet receiving end of said female fitting enclosed within a plurality of side walls; an indentation in at least two opposing said side walls and a bayonet tip receiving slot within each said indentation; a plurality of web members within said bayonet receiving end, said web members further comprising means for guiding and receiving said bayonet members from a male fitting in mating relationship [wherein at least two said web members of said female fitting further comprise at least one slot in each said web member adapted to receive at least one reenforcing flange of a central rigid bayonet of a male fitting;
   (b) a male fitting having a working head receiving end and a bayonet end comprising a central rigid bayonet flanked by a pair of flexible resilient bayonets adapted to seat within said bayonet receiving slots of said female fitting, wherein said central rigid bayonet further comprises four reenforcing flanges having a triangular shape connected to a lower portion of said central rigid bayonet and to a floor of said bayonet end of said male fitting.

7. A quickly attachable and detachable connector for connecting a handle to a working head according to claim 6 wherein each of said flexible resilient bayonets further comprises an inwardly curved portion adjacent to a tip for easing insertion into said bayonet receiving receptacles, a gripping ledge immediately adjacent to a lower portion of said curved portion, and a straight portion between said gripping ledge and a floor of said bayonet end of said male fitting, with said flexible resilient bayonets and said female fitting deflecting both said flexible resilient bayonets toward a center of the connector during insertion of said male fitting into said female fitting, said curved portions of said flexible resilient bayonets being received by said bayonet receiving slots, whereupon each said flexible resilient bayonet is urged outward from a center of the connector by its elasticity and said gripping ledge of each said flexible resilient bayonet engages an upper edge of each said bayonet receiving slot, thereby preventing disengagement of said male fitting from said female fitting.

8. A quickly attachable and detachable connector for connecting a handle to a working head according to claim 7 further comprising a separating wall between said handle connecting portion and said receptacles of said female fitting.

9. A quickly attachable and detachable connector for connecting a handle to a working head comprising:
   (a) a female fitting having a handle-connecting portion at one end and a plurality of bayonet receiving receptacles at a bayonet receiving end of said female fitting enclosed within a plurality of side walls; an indentation in at least two opposing said side walls and a bayonet tip receiving slot within each said indentation; a plurality of web members within said bayonet receiving end, further comprising means for guiding and receiving bayonet members from a male fitting;
   (b) a male fitting having a working head receiving end and a bayonet end comprising a central rigid bayonet flanked by a pair of flexible resilient bayonets that seat within said bayonet receiving slots of said female fitting, wherein said central rigid bayonet further comprises four reenforcing flanges having a triangular shape connected to a lower portion of said central rigid bayonet and to a floor of said bayonet end of said male fitting; wherein each of said flexible resilient bayonets further comprises an inwardly curved portion adjacent to a tip for easing insertion into said bayonet receiving receptacles, a gripping ledge immediately adjacent to a lower portion of said curved portion, and a straight portion between said gripping ledge and a floor of said bayonet end of said male fitting, with said flexible resilient bayonets and said female fitting deflecting both said flexible resilient bayonets toward a center of the connector during insertion, said curved portions of said flexible resilient bayonets being adapted to be received in said bayonet receiving slots, whereupon each said flexible resilient bayonet is urged outward from a center of the connector by its elasticity and said gripping ledge of each said flexible resilient bayonet engages an upper edge of each said bayonet receiving slot, thereby preventing disengagement of said male fitting from said female fitting.

10. A quickly attachable and detachable connector for connecting a handle to a working head according to claim 9 further comprising a separating wall between said handle connecting portion and said receptacles of said female fitting.

11. A quickly attachable and detachable connector for connecting a handle to a working head according to claim 9 further comprising:
   (a) a handle connected to said handle-connecting portion of said female fitting; and
   (b) a working head connected to said working head receiving end of said male fitting.

12. A quickly attachable and detachable connector for connecting a handle to a working head according to claim 11 wherein said working head further comprises a mop head.

13. A quickly attachable and detachable connector for connecting a handle to a working head according to claim 11 wherein said working head further comprises a broom.

14. A quickly attachable and detachable connector for connecting a handle to a working head according to claim 11 wherein said working head further comprises a paint roller.

15. A quickly attachable and detachable connector for connecting a handle to a working head according to claim 11 wherein said working head further comprises a squeegee.

* * * * *